United States Patent [19]

Pham et al.

[11] Patent Number: 5,062,122
[45] Date of Patent: Oct. 29, 1991

[54] DELAY-LOCKED LOOP CIRCUIT IN SPREAD SPECTRUM RECEIVER

[75] Inventors: Hiep V. Pham, Germantown, Md.; Hirotaka Namioka, Tokyo, Japan

[73] Assignees: Kenwood Corporation, Tokyo, Japan; Hughes Network Systems, Inc., Germantown, Md.

[21] Appl. No.: 250,412

[22] Filed: Sep. 28, 1988

[51] Int. Cl.[5] .................................... H04L 9/00
[52] U.S. Cl. ................................... 375/1; 380/34
[58] Field of Search ........................... 375/1; 380/34

[56] References Cited

U.S. PATENT DOCUMENTS 4,100,498 7/1978 Alsup et al. ............................ 375/1

FOREIGN PATENT DOCUMENTS 0084219 4/1988 Japan .

OTHER PUBLICATIONS

"Spread Spectrum Communication System", by K. Tsukamoto, the Journal of the Institute of Television Engineers of Japan, vol. 33, No. 3, 1979, pp. 162-169.

Primary Examiner—Salvatore Cangialosi
Attorney, Agent, or Firm—Sixbey, Friedman, Leedom & Ferguson

[57] ABSTRACT

Spread spectrum receiver includes a delay locked loop (DLL) circuit for holding the synchronization of a despread signal with a received spread spectrum signal. The DLL circuit comprises a subtracter for generating a signal representative of a subtraction between first and second correlation signals, a positive feedback amplifier for amplifying the subtraction representative signal and a window comparator for producing a lock signal when the subtraction representative signal is positioned within a window width.

12 Claims, 10 Drawing Sheets

CIRCUIT PARAMETER
DATA
R5 = 1KΩ
R6 = 1KΩ
R7 = 430KΩ

CIRCUIT PARAMETER DATA
R1=R3=2KΩ
R2=6.2KΩ
R4=390KΩ

FIG. 7A

CIRCUIT PARAMETER DATA
R5,R6=1KΩ
C1=0.01μF
C2=NON

CIRCUIT PARAMETER DATA
R5, R6 = 1KΩ
C1 = 0.01μF
C2 = 0.1μF

FIG. 7C

OUTPUT RESPONSE

CIRCUIT PARAMETER DATA
R5, R6 = 1KΩ
C1 = 0.01μF
C2 = 0.1μF

FIG. 7D

DELAY-LOCKED LOOP CIRCUIT IN SPREAD SPECTRUM RECEIVER

FIELD OF THE INVENTION

The present invention relates to a spread spectrum communication system and, more particularly, to a delay-locked loop circuit (DLL) in a receiver of that system.

CONVENTIONAL ART

The spread spectrum system includes the following systems.
 (1) DS (Direct Sequence) system
 (2) FH (Frequency Hopping) system
 (3) TH (Time Hopping) system
 (4) Pulse coding FM system
 (5) Hybrid system In general, at present, the DS and FH systems are used, the TH system and pulse coding FM system are applied to the limited fields, and the hybrid system is being theoretically studied. The principle of the DS system will now be described. On the transmission side, the information signal is subjected to an ordinary modulation (primary modulation). The primary-modulated signal is then modulated by the spread pseudo noise code (spread PN code) of a wide band and transmitted as a wide band signal having a very small power density. This operation is called a spread modulation. On the reception side, the correlation with the received or incoming signal is derived by use of the same demodulating PN code as that on the transmission side. After the correlation was obtained, only the signal to be received is converted into the original primary-modulated signal of the narrow band. The other signals and interference signal become the wide band noises having a small power density. Only a desired signal is extracted by a filter. The primary modulation can use the analog system such as FM and the digital system such as PSK. In general, the PSK system by the pseudo noise (PN) code is used as the spread modulation.

It is required that the demodulating PN code which is generated on the reception side has the same bit constitution and the same phase as those of the PN code in the incoming or received spread spectrum signal. Therefore, the initial synchronization (synchronization trapping) is performed to make the phase of the PN code on the reception side coincide with the phase of the PN code in the incoming signal. Next, in order to keep the phase-coincident PN code on the reception side, the synchronization holding process is performed by a delay-locked loop circuit (DLL).

In a conventional DS type spread spectrum synchronization and demodulation circuit, as the phase pattern of a local PN code gradually coincides with that the received PN code, the maximum correlation max-value can be obtained. By preparing two lines of local PN codes which are shifted in phase by one bit to other, correlations of the received signal PN code to respective local PN codes are taken in two line despreading circuits, each including bandpass filter and detector. A phase discrimination curve is obtained by taking the subtractive difference between two correlation outputs from two line despreading circuits. The inter-code synchronization maintenance closed loop is constructed by utilizing this phase discrimination curve. That is, the VCO which generates a clock for driving the local PN code generator FSR (feedback shift register) is controlled by the phase discrimination output voltage according to the characteristic curve. In the initial synchronization capture operation, a search voltage is applied to the VCO so that the clock frequency of the local PN code is offset with respect to the clock frequency of the received signal PN code to relatively sweep the chip phase by that frequency difference.

In conventional DLL circuits wherein the detection of PN code synchronization is conducted through the detector output after despreading, the response speed, reliability and the detection range are not sufficient when a carrier noise ratio (C/N) is low.

As another problem of conventional DLL circuits, it is required to design the narrower loop bandwidth of DLL circuit for decreasing the jitter of a PN code clock regenerated in the DLL circuit. This design requirement, however, results in a slower response speed in the DLL circuit.

Accordingly, the first objective of the invention is to provide a DLL circuit with high speed PN code synchronization, high reliability and wide detection range even where C/N is low.

Further objective of the invention is to decrease the jitter of a PN code clock without sacrificing the response speed in the DLL circuit.

SUMMARY OF THE INVENTION

Spread spectrum receiver according to the present invention includes a terminal for a received spread spectrum signal and a delay locked loop (DLL) circuit for holding the synchronization of a despread signal with the received spread spectrum signal. The DLL circuit comprises a voltage control oscillator for generating a clock signal; a despread signal generator controlled by the clock signal for generating a first despread signal and second despread signal, the first despread signal being shifted in phase by one bit to the second despread signal; first correlation means for producing a first signal representative of a correlation of the received spread spectrum signal with the first despread signal; second correlation means for generating a second signal representative of a correlation of the received spread spectrum signal with the second despread signal; a subtracter for generating a signal representative of a subtraction between the first and second correlation representative signals; a positive feedback amplifier for amplifying the subtraction representative signal which is applied to the voltage control oscillator as a control signal; and a window comparator with a predetermined window width for in response to the subtraction representative signal for producing a lock signal when the subtraction representative signal is positioned within the window width and an unlock signal when outside the window width.

DETAILED DESCRIPTION OF THE EMBODIMENTS

Figure 1:
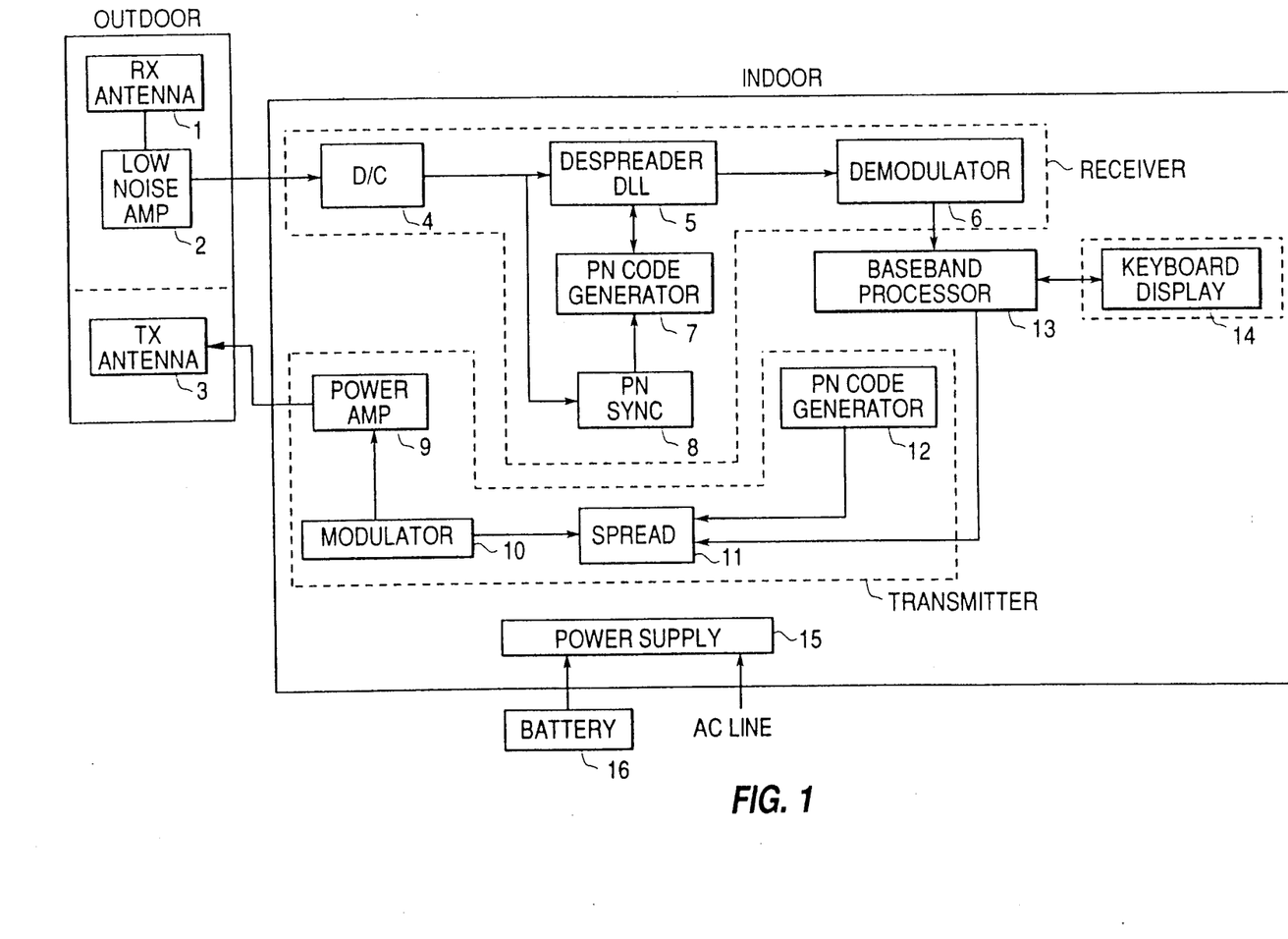
FIG. 1 is a block diagram of communication apparatus used in a spread spectrum system to which the present invention is applied.

FIG. 1 is a block diagram of communication apparatus used in a spread spectrum communication system to which the present invention is applied. The apparatus comprises an outdoor unit, indoor unit and keyboard-display unit. The indoor unit can be divided into three parts of receiver, transmitter and baseband signal processor. The outdoor unit of RX antenna 1, low noise amplifier 2 and TX antenna 3 receives a wide band signal in a radio-wave frequency from a satellite and amplifies the received wide band signal or transmits the radio-wave frequency signal from the transmitter of the indoor unit. D/C converter 4 converts the amplified wide band signal in the radio-wave frequency into an intermediate frequency (IF) signal. Despreader 5 provided with a DLL circuit, PN code generator 7 and PN synchronization circuit 8 despreads the IF converted wide band signal into a narrow band signal from which data can be demodulated by demodulator 6. Baseband processor 13 processes the demodulated base band data under the instructions entered by keyboard/display 14. The processed data is displayed on keyboard/display 14. In addition, the data to be transmitted are entered to baseband processor 13 by keyboard/display 14. Spreader 11 spreads the data to be transmitted to a wide band signal by a PN code generated from PN code generator 12. In modulator 10, the spreaded data modulates the transmission carrier wave. The modulated transmission wave is power-amplified by power amplifier 9 and radiated from TX antenna 3. Power supply 15 which supply the system with power is energized by AC line or battery 16. The present invention is the improvement of a DLL circuit in the receiver wherein a transmission data is demodulated by solving the received spread spectrum signal output from the downconverter (D/C) (this is called "despreading"). The DLL circuit enables the despreader circuit which despreads the received signal to demodulate the transmission data in the demodulator by keeping the synchronization of a PN code generated from the PN code generator 7 with a PN code of the received signal. To keep the synchronization of the PN code with the received signal is performed by controlling the frequency of a clock signal applied to the PN generator. For an initial synchronization, the phase state of the PN code in the received signal is detected by the PN synchronization circuit (PN SYNC) 8 and the detection output from PN SYNC is used to obtain the initial synchronization. After the initial synchronization, the synchronization is kept by the DLL circuit.

(First Embodiment)

Figure 2:
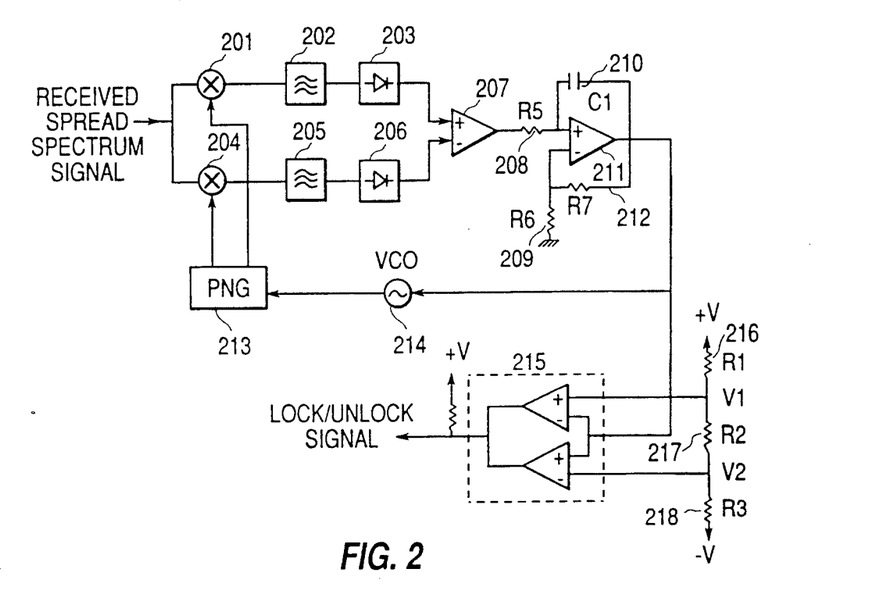
FIG. 2 is a circuit diagram of the first embodiment of an improved DLL circuit according to the present invention.

The first embodiment of an improved delay-locked loop (DLL) circuit according to the present invention is shown in FIG. 2. The received spread spectrum signal diffused by a PN code sequence pattern is applied to one input of multipliers 201 and 204. To the other input of multiplier 201 and 204 PN code patterns generated from PN code generator 213 are respectively applied, one PN code pattern being shifted by one bit with respect to the other PN code pattern. In multiplier 201 and 204 such as double balance modulator (DBM), correlations between the received signal and the generated PN code patterns are taken and the correlation outputs are respectively applied to envelope detectors 203 and 206 through bandpass filters 202 and 205. The correlation signal from two correlation circuits (201, 202 and 203; 204, 205 and 206) are subtracted at subtracter 207. When the generated PN code pattern is synchronized with the PN code pattern which in the received signal, the subtraction results becomes zero. Otherwise, some magnitude voltage is output from subtracter 207 and then applied to the next stage of an active lowpass filter which comprising amplifier 211, resistors 208, 209 and 212 and capacitor 210. The cut-off frequency of the active lowpass filter is selected to determine the response speed of feedback loop in the DLL circuit. In the embodiment of FIG. 2, the active lowpass filter is arranged in a positive feedback system to have a high gain so that the output of the filter is deflected to the positive or negative saturated reference voltage wherever the DLL circuit is in a non-synchronous state and thus some magnitude voltage remains at the output of subtracter 207.

The output of the active lowpass filter is supplied to VCO 214. The clock generated from VCO which is being controlled in frequency and phase by the output voltage serves to determine the operation timing of PN code generator 213. This feedback look works to keep the synchronous state.

The subtraction output signal is also applied to the window comparator 215. The window width V1–V2 of which is determined by resistors 216, 217 and 218 and reference voltage $+V$ and $-V$. When the output from the active lowpass filter is within the window (that is, V1–V2), the comparator output becomes a HIGH level which represents a lock condition. While, when the signal is outside the range of V1–V2, the comparator output becomes a LOW level which represents an unlock condition. The active filter LPF is arranged in a positive feedback system to obtain a high gain so that the detection between the synchronous state and the non-synchronous state can be reliably made.

With the above feature, since the detection of PN code synchronization can be quickly and also reliably made through the voltage value at the control terminal of the VCO which generates the PN code clock, a high speed PN code synchronization sequence can be realized and thus the time required to achieve the PN code synchronization can be reduced in a PN code synchronization system which includes a correlator such as SAW convolver.

Figure 3A:
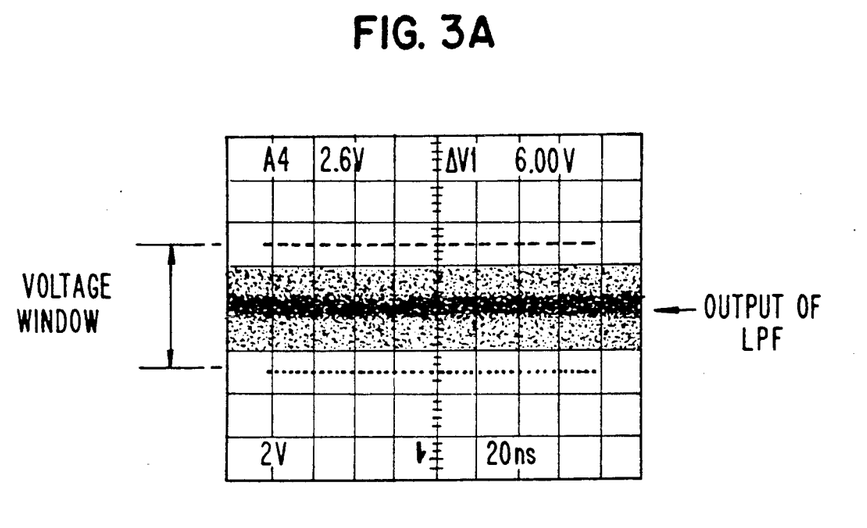
FIG. 3A is a photograph which shows the output voltage from the lowpass filter in the DLL circuit in a PN code synchronized state.
Figure 3B:
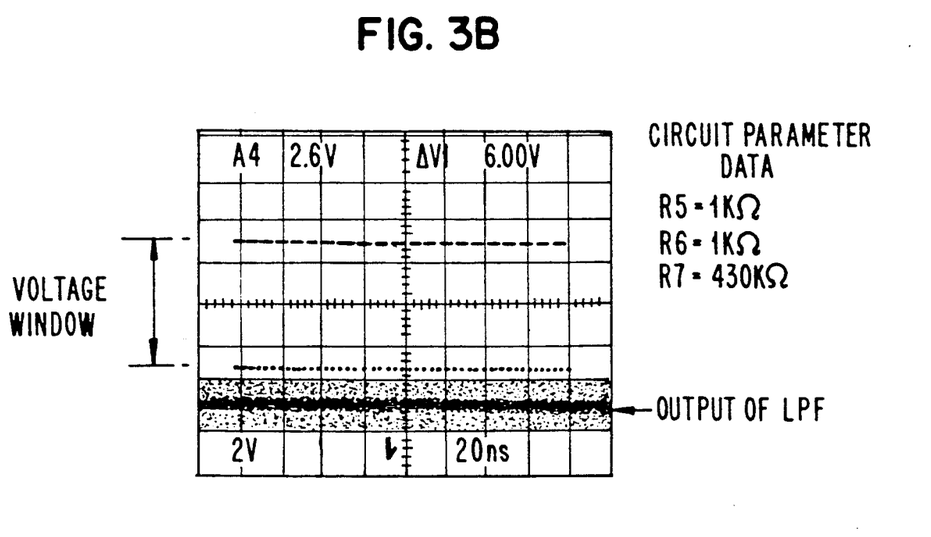
FIG. 3B is a photograph which shows the output voltage from the lowpass filter in the DLL circuit in a PN code non-synchronized state when the positive feedback is taken in the lowpass filter.
Figure 3C:
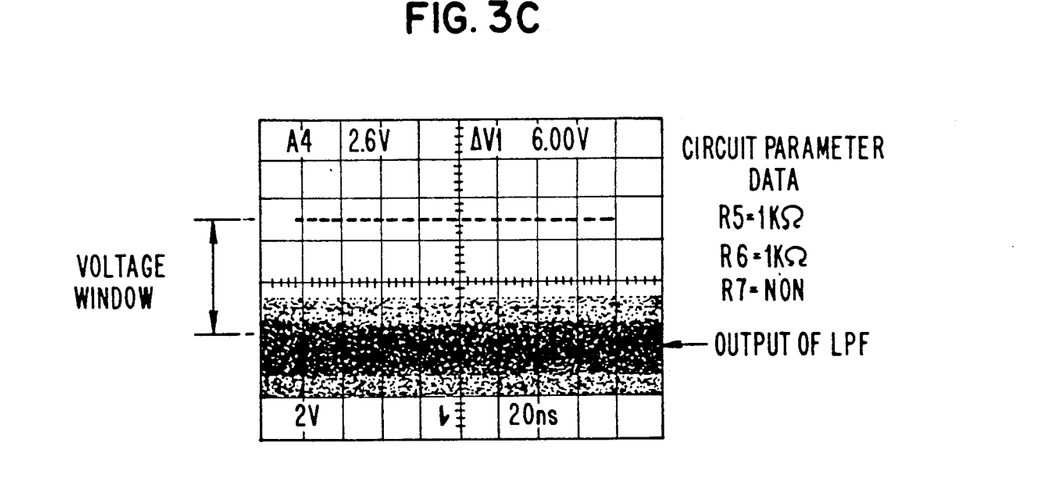
FIG. 3C is a photograph which shows the output voltage from the lowpass filter in the DLL circuit in a PN code non-synchronized state when the positive feedback is not taken in the lowpass filter.

Experimental data can exhibit the effectiveness in use of the positive feedback lowpass filter. FIG. 3A shows the output voltage of the lowpass filter in the DLL circuit in a PN code synchronized state. The output of the lowpass filter is positioned within the window defined by two dash lines. FIG. 3B shows the output voltage of the lowpass filter in the DLL circuit in a non-synchronized state when the positive feedback is taken in the lowpass filter. The output is safely positioned outside the window. FIG. 3C shows the output voltage of the lowpass filter in the DLL circuit in a non-synchronized state when the positive feedback is not taken in the lowpass filter. Part of the output of the lowpass filter has fallen inside the window. This results in the instability in the detection of lock/unlock condition.

In order to take a synchronization of the PN code with the received signal, it is necessary to reset the PN code generator 7 of FIG. 1 by the timing detected in PN synchronization circuit 8 of FIG. 1 and further keep the accurate synchronization by the DLL circuit. In this sequence of operation, the lock signal from the DLL circuit is used to control the resetting for PN code generator 7. When the DLL circuit is locked, the resetting for the PN code generator is not made. On the other hand, when the DLL circuit is in out-of-lock, the PN code generator is reset again by the timing output from the PN synchronization circuit. The timing is not properly detected by the PN synchronization circuit when the received signal includes noises. In this sense, it is necessary to made the resetting a plurality of times until the accurate synchronization for the PN code is taken.

(Second Embodiment)

Figure 4:
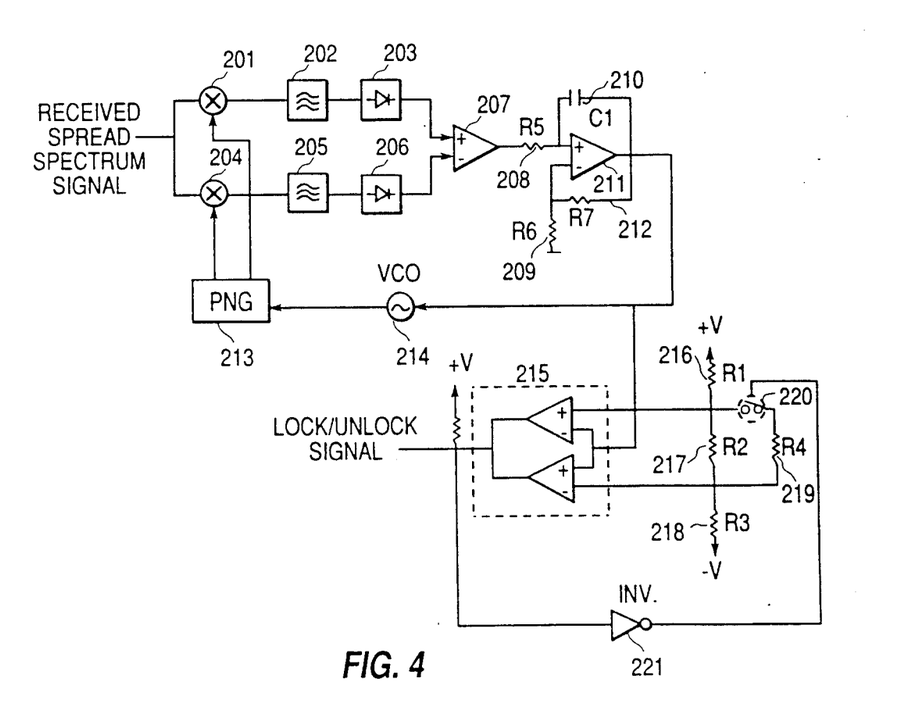
FIG. 4 is a circuit diagram of the second embodiment of DLL circuit according to the present invention.

In FIG. 4, there is shown further improvement of the first embodiment wherein the window width of the comparator is automatically changed. In FIG. 4, the same member as that of FIG. 2 is given the same reference.

With this feature, further reliable high speed PN code synchronization can be realized by overcoming the problem of deterioration in reliability of PN code synchronization detection in conventional circuits, which occurs when the carrier-noise ratio (C/N) of a received signal becomes low.

An shown in FIG. 4, additionally there are provided switch 220, resistor 219 and invertor 221. Resistors 216, 217, 218 and 219 define the voltage window in the comparator 215 and resistor 216 is disposed in parallel to R2 is selected to be smaller in resistance than resistor 217. The control terminal of switch 220 is controlled by the lock signal at the output of the comparator to selectedly connect resistor 219 across resistor 217.

When the PN code generated in the PN generator 213 is non-synchronized with the received signal, the lock signal exhibits a LOW level which in turn is inverted at invertor 221. This inverted lock signal (HIGH level) enables the switch SW to close so that resistor 219 with a very low resistance value is connected across resistor 217. As a result, the window width becomes narrow. During the non-synchronous state, even if the positive or negative saturation voltage at the output of the lowpass filter is deflected by noises in the received signal and approaches to the center, the possibility that the comparator erroneously judges the state as "synchronization" is small because the window width is narrow. Accordingly, the reliability in judging the synchronous state is heightened.

On the other hand, during the initial synchronization process the output voltage of the lowpass filter turns toward the center voltage of 0 Volt. As the output voltage of the lowpass filter approaches to 0 Volt and enters the window which has been so far narrow, the lock signal turns to a HIGH level from the LOW level which exhibits the synchronization state. The inverted HIGH level signal disables the switch 220 to disconnect resistor 219. Consequently, the window width becomes wide. In this wide window width, even if the output voltage of the lowpass filter is deflected from 0 Volt by some amount due to noises in the receiving signal, the possibility that the comparator errorously judges the state as "non-synchronization" is very small because the window width is wide.

Figure 5A:
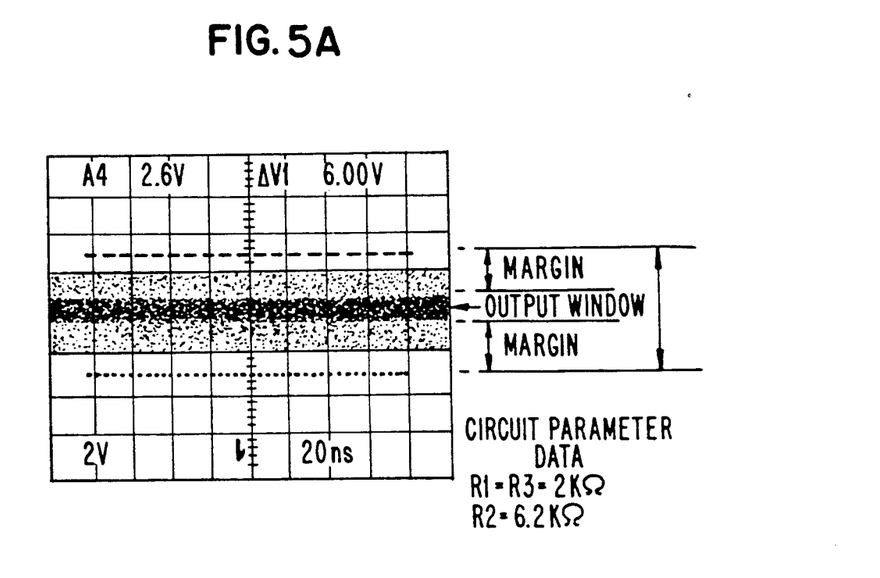
FIG. 5A and FIG. 5B are photographs which illustrate the wide window and narrow window automatically switched in the second embodiment of FIG. 4.
Figure 5B:
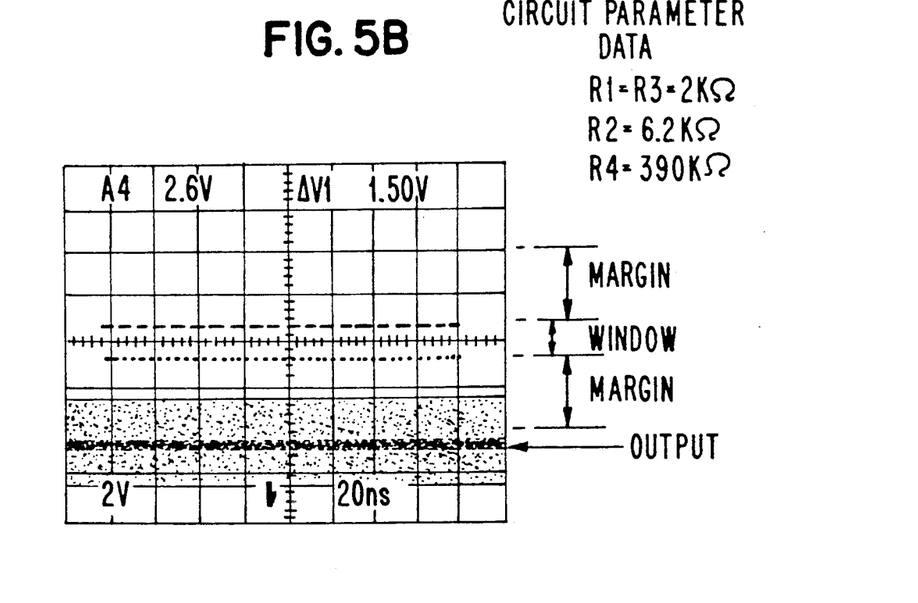

FIG. 5A and FIG. 5B can illustrate the window which is automatically changed between a wide window in a PN code synchronized state and a narrow window in a PN code non-synchronized state. FIG. 5A shows the wide window in a PN code synchronized state. The output of the lowpass filter is positioned within the wide window, with a large margin. FIG. 5B shows the narrow window in a PN code non-synchronized state. The output of the lowpass filter is far from the window edge.

(Third Embodiment)

Figure 6:
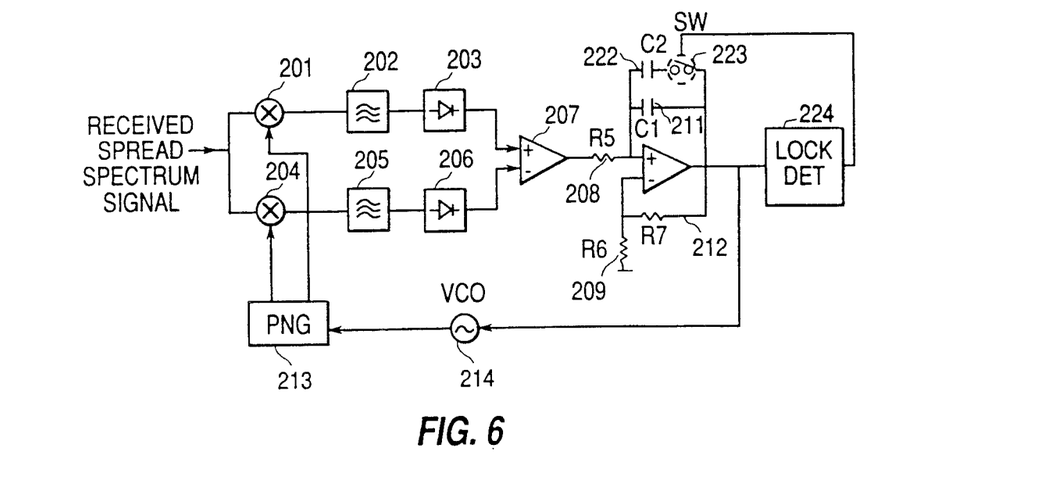
FIG. 6 is a circuit diagram of the third embodiment of DLL circuit according to the present invention.

Another improvement of the first embodiment is shown in FIG. 6. In FIG. 6, the same member as that of FIG. 2 is given the same reference. The capacitor across the input and output terminals of the active lowpass filter LPF is an element to determine the DLL loop bandwidth. When the jitter of a PN code clock to be regenerated in the DLL circuit is required to be reduced, it is necessary to render the DLL bandwidth narrower. This, however, results in the slow DLL response.

In FIG. 6, there are provided additional members of capacitor 222, switch 223 and lock detector 224. The control terminal of a switch 223 is controlled by the output of a lock detector 224 to selectedly connect capacitor 222 to capacitor 211 in parallel. The time constant T1 of resistor R5 and capacitor 211 is smaller the time constant T2 of resistor R5 and the total capacitance of parallel capacitors 211 and 222. When the DLL circuit is in synchronization, the lock detector 224 produces a control signal to close switch 223.

During the initial synchronization capture process, first the switch 223 is in an OFF state because the lock detector 224 does not produce a lock signal. At this stage, the loop response is determined by the small time constant T2 of resistor R5 and capacitance 211 and thus a quick response is obtained. As the PN code synchronization has been achieved in the DLL circuit, the lock detector 224 produces the lock signal which enables the switch to close so that the capacitor 222 is connected across Cl in parallel. As a result, the DLL loop bandwidth becomes narrow and thus the jitter of the PN code clock is reduced.

With this feature, the jitter of the regenerated PN code clock is reduced without rendering the DLL response slow in the initial synchronization capture process.

Figure 7A:
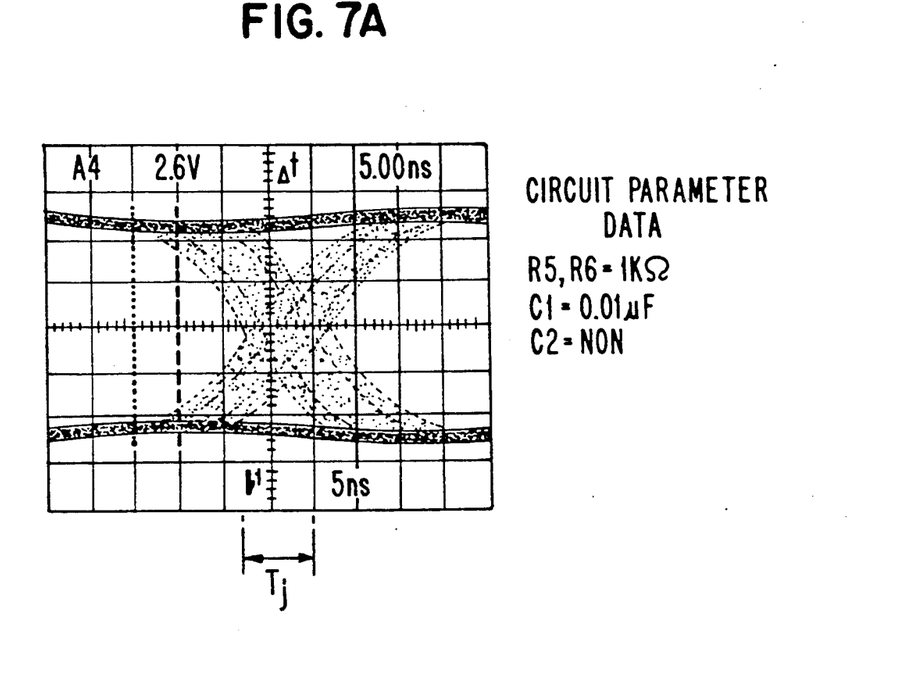
FIG. 7A and FIG. 7B are photographs which indicate the difference between jitters which were measured at a wide loop bandwidth and narrow bandwidth automatically changed in the third embodiment of FIG. 6.
Figure 7B:
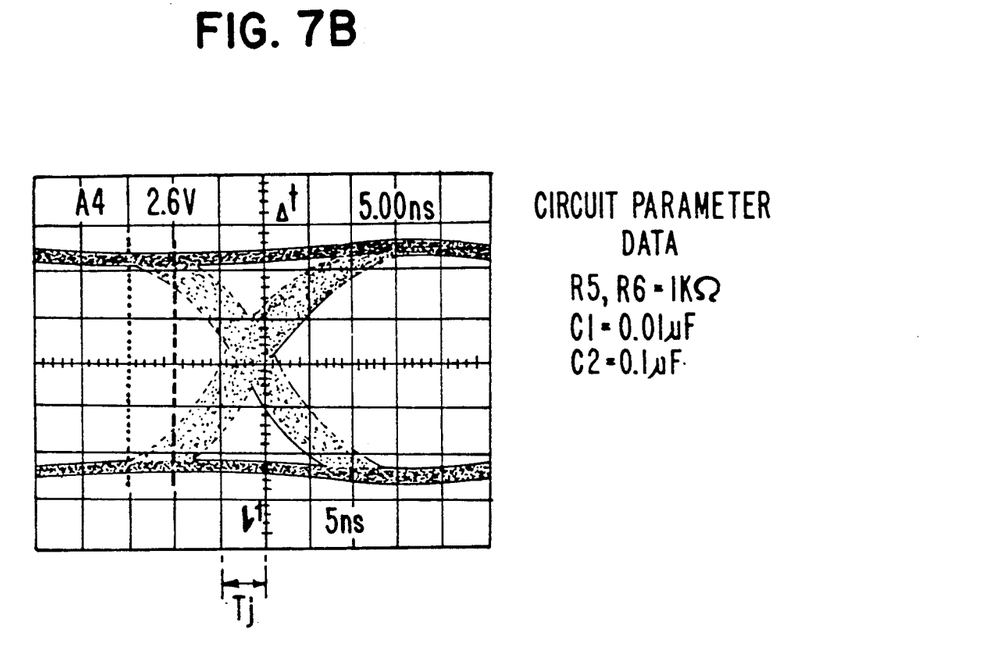

FIG. 7A and FIG. 7B indicate the difference between jitters which were measured at a wide loop bandwidth and an automatically changed narrow bandwidth. In FIG. 7A, the PN code signal synchronized with the received signal when the loop bandwidth of the DLL circuit is not changed as the wide width is shown. From the photograph of FIG. 7A, jitter $T_j = 8$ $\mu$sec can be measured. FIG. 7B shows the PN code signal synchronized with the received signal when the loop bandwidth of the DLL circuit is changed to the narrow width. As the measure taken from the photograph of FIG. 7B, jitter $T_j$ is reduced to 5 $\mu$sec.

Figure 7C:
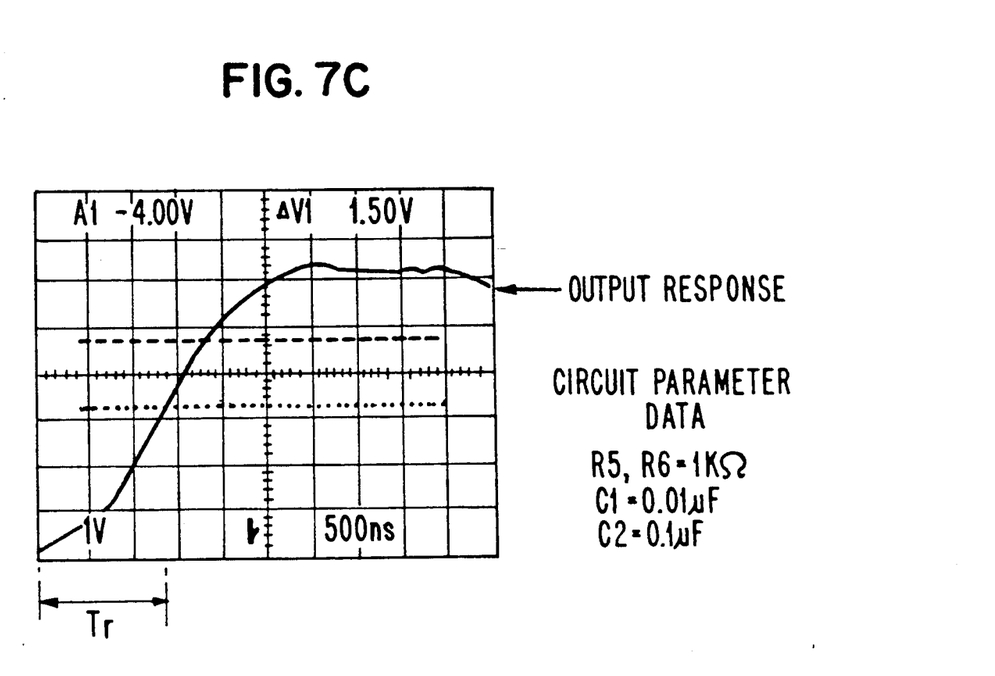
FIG. 7C and FIG. 7D are photographs which show output responses at the DLL bandwidth automatically changed between a synchronized state and non-synchronized state in the third embodiment of FIG. 6.
Figure 7D:
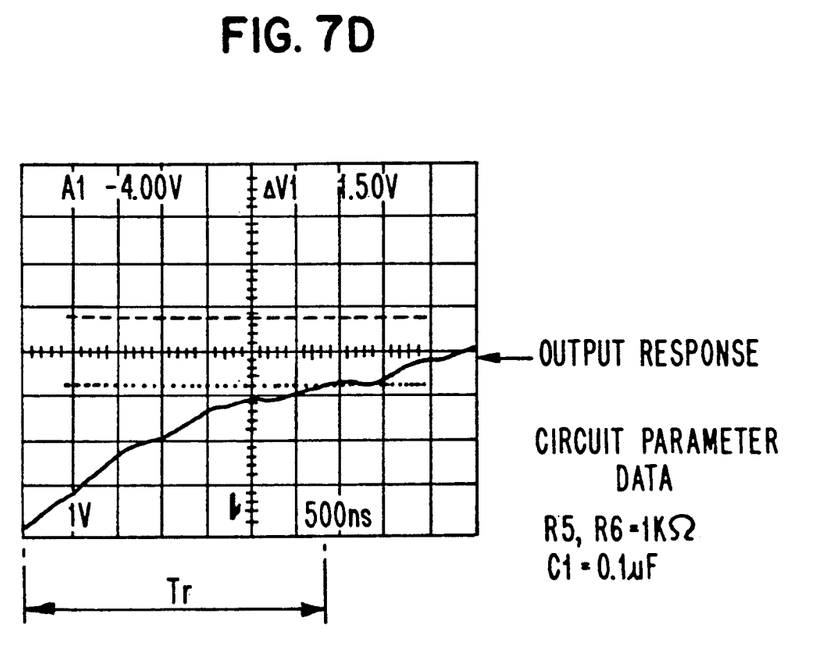

FIG. 7C and FIG. 7D show output responses at the DLL bandwidth which is automatically changed between a synchronized state and non-synchronized state. In FIG. 7C, from the output response of the lowpass filter when the loop bandwidth of the DLL circuit is changed to the narrow width, the response time Tr can be measured as 1,300 $\mu$sec. In FIG. 7D, from the output response of the lowpass filter when the loop bandwidth of the DLL circuit is not changed, the response time Tr is as large as 3,300 $\mu$sec.

(Forth Embodiment)

Figure 8:
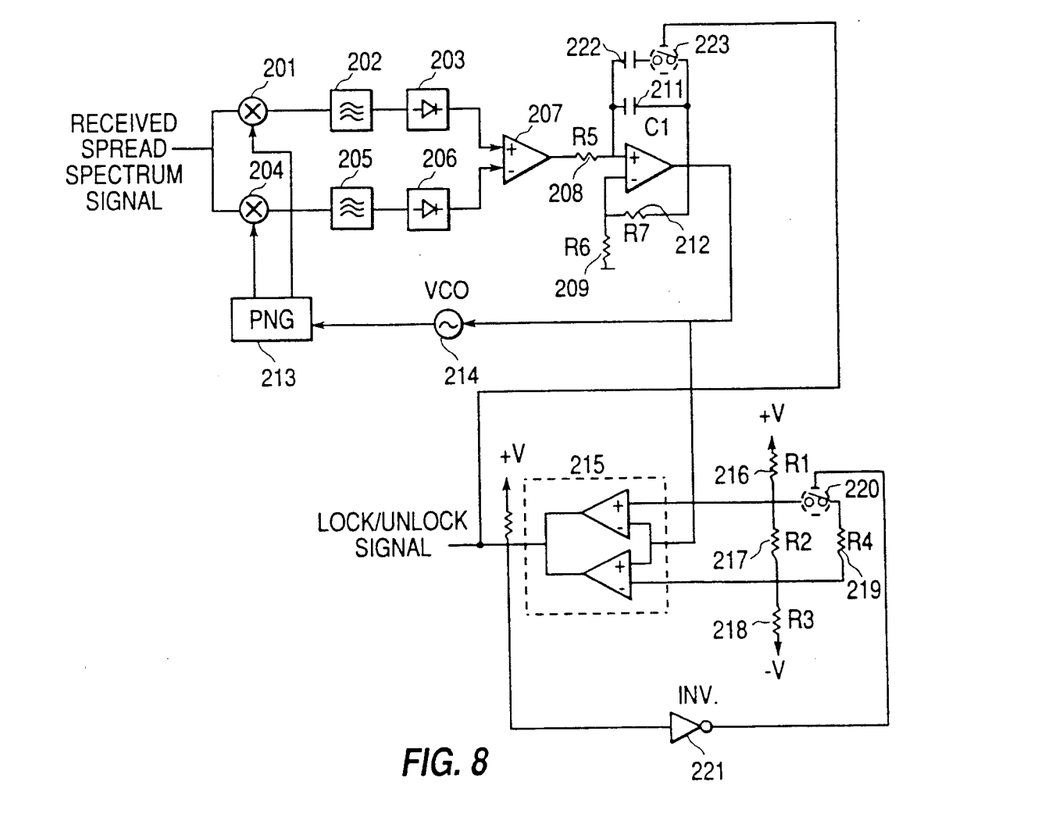
FIG. 8 is a circuit diagram of the fourth embodiment of DLL circuit according to the present invention.

As shown in FIG. 8, the embodiments of FIGS. 4 and 6 are combined to improve the performances aforementioned in association with FIGS. 4 and 6.

What is claimed is:

1. Spread spectrum receiver including a terminal for a received spread spectrum signal and a delay locked loop circuit for holding the synchronization of a despread signal with the received spread spectrum signal, the circuit comprising:
   a voltage control oscillator for generating a clock signal;
   a despread signal generator controlled by said clock signal for generating a first despread signal and second despread signal, the first despread signal being shifted in phase by one bit to the second despread signal;
   first correlation means for producing a first signal representative of a correlation of the received spread spectrum signal with the first despread signal;
   second correlation means for generating a second signal representative of a correlation of the received spread spectrum signal with the second despread signal;
   a subtracter for generating a signal representative of a subtraction between said first and second correlation representative signals;
   a positive feedback amplifier for amplifying said subtraction representative signal which is applied to said voltage control oscillator as a control signal; and
   a window comparator with a predetermined window width for in response to the subtraction representative signal for producing a lock signal when the subtraction representative signal is positioned within the window width and an unlock signal when outside the window width.

2. Spread spectrum receiver according to claim 1 further comprising means for adjusting the window width of said window comparator.

3. Spread spectrum receiver according to claim 2, wherein said window width adjusting means in response to the lock signal from said window comparator sets a wide window width and in response to the unlock signal from said window comparator sets a narrow window width.

4. Spread spectrum receiver according to claim 1, wherein said positive feedback amplifier is arranged to be a lowpass filter.

5. Spread spectrum receiver according to claim 4 further comprising means for adjusting the delay locked loop response by changing the cut-off frequency of said lowpass filter.

6. Spread spectrum receiver according to claim 5, wherein said delay locked loop adjusting means in response to the non-synchronous condition sets a first delay locked response and in response to a synchronous condition sets a second delay locked response, the first response being quicker than the second response.

7. A spread spectrum receiver comprising:
   a terminal for receiving a spread spectrum signal;
   means (213) for generating a despread signal;
   means (201-212) for producing a synchronization signal derived from the synchronization status of the despread signal with the received spread spectrum signal;
   means (215-218) for forming a lock signal when the synchronization signal is within a predetermined range and unlock signal where the synchronization signal outside the predetermined range; and
   means (219, 220, 221) for setting a first width for the predetermined range in response to the lock signal and a second width in response to the unlock signal, the first width being wider than the second width.

8. A spread spectrum receiver according to claim 7 further comprising means in response to the unlock signal for taking an initial synchronization in said despread signal generating means.

9. A spread spectrum receiver according to claim 7 further comprising means (214) for generating a clock signal which determines the despread signal generation timing, the lock signal generating means being controlled by the synchronization signal so that the despread signal is synchronized with the received signal.

10. A spread spectrum receiver according to claim 7, wherein said synchronization signal producing means comprises a delay locked loop (DLL) circuit.

11. A spread spectrum receiver according to claim 10 further comprising means (222, 223) for setting a first DLL loop bandwidth in response to the unlock signal and a second DLL loop bandwidth in response to the lock signal, the first bandwidth being wider than the second bandwidth.

12. A spread spectrum receiver according to claim 10, wherein said DLl circuit include positive feedback amplifier.

* * * * *